Dec. 12, 1939. H. W. PFEFFER ET AL 2,182,854
DUST COLLECTION APPARATUS
Filed July 24, 1937  4 Sheets-Sheet 1

INVENTORS
HENRY W. PFEFFER,
HARRY O. DANZ.
BY
Attorneys

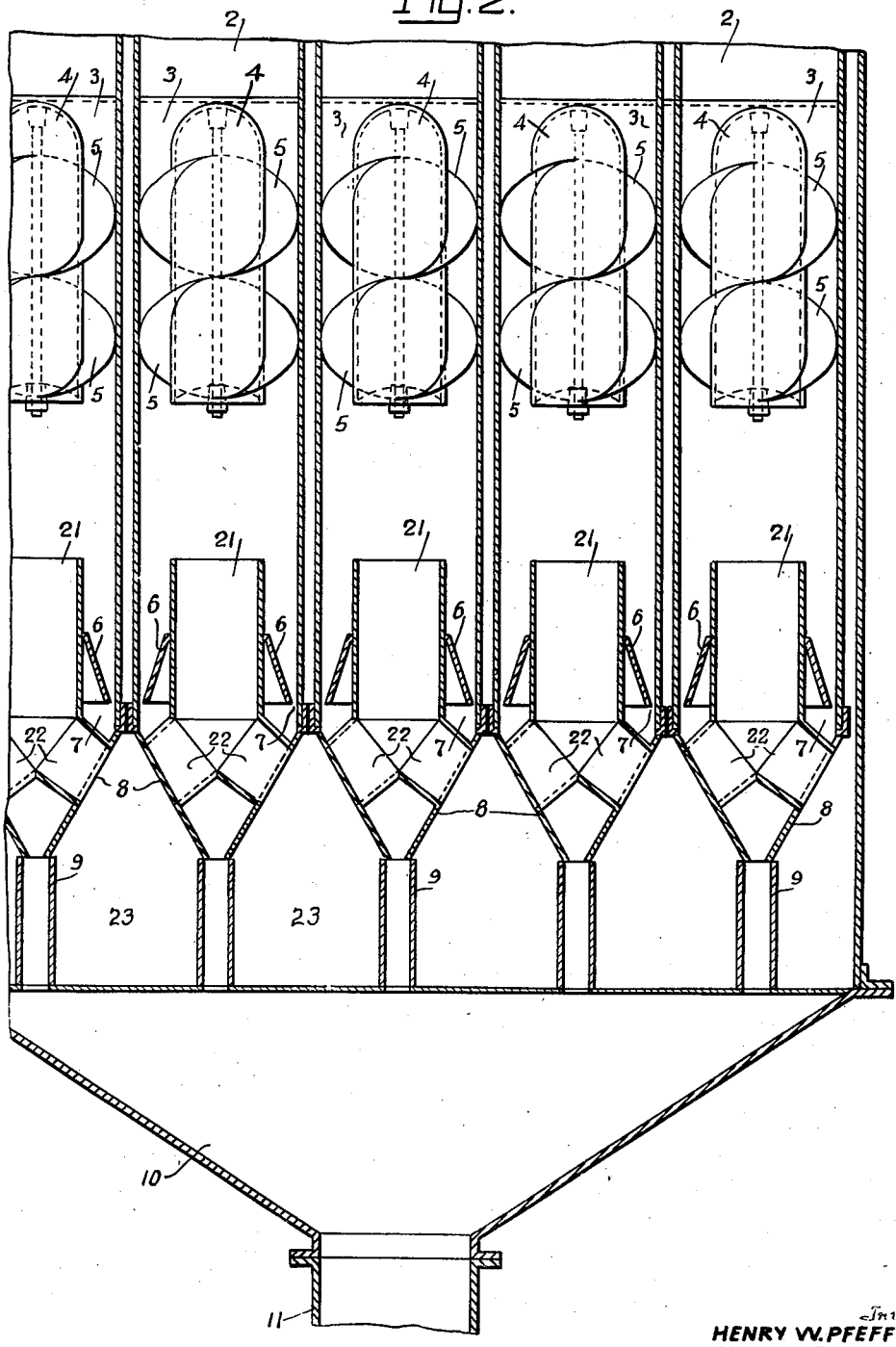

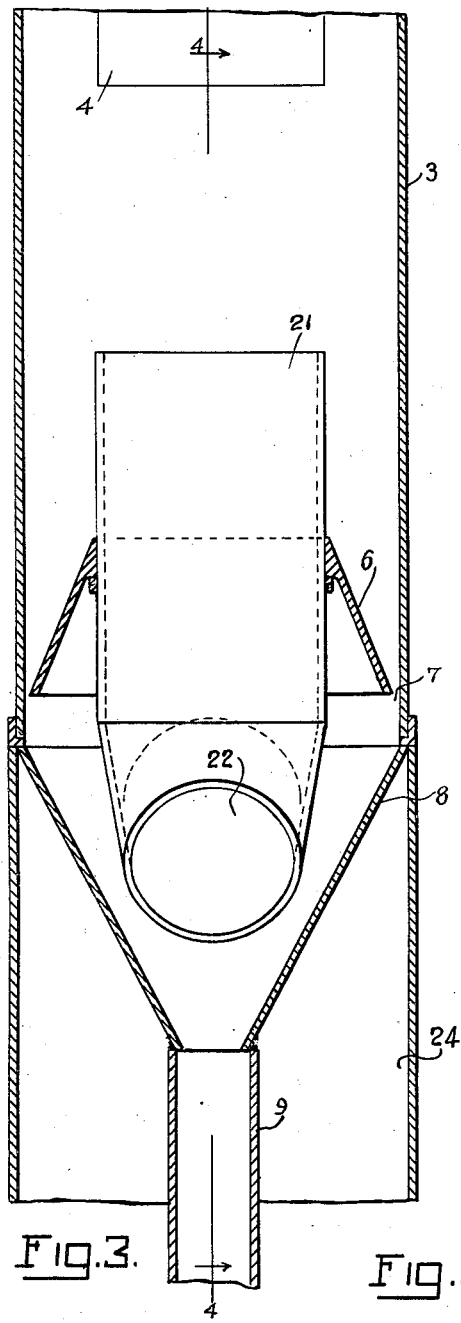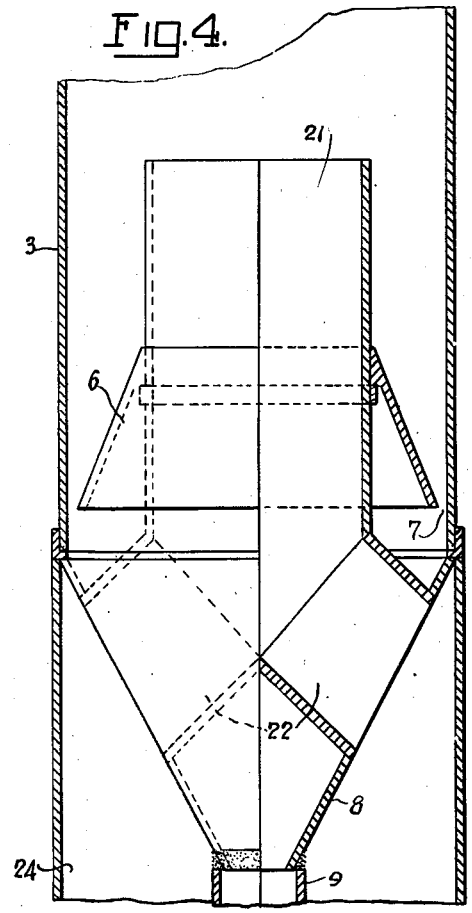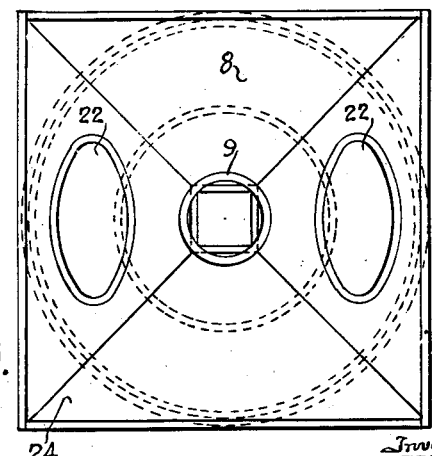

Dec. 12, 1939.  H. W. PFEFFER ET AL  2,182,854
DUST COLLECTION APPARATUS
Filed July 24, 1937  4 Sheets-Sheet 4
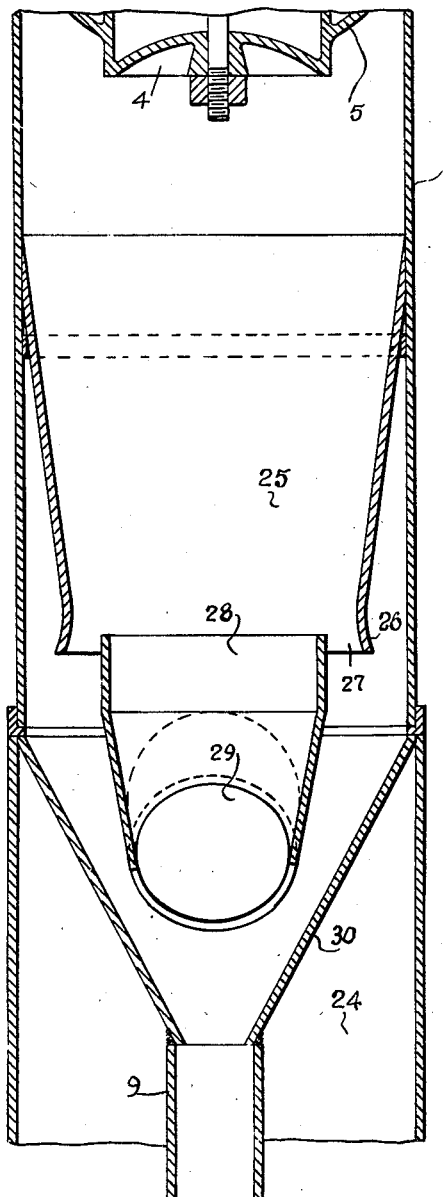
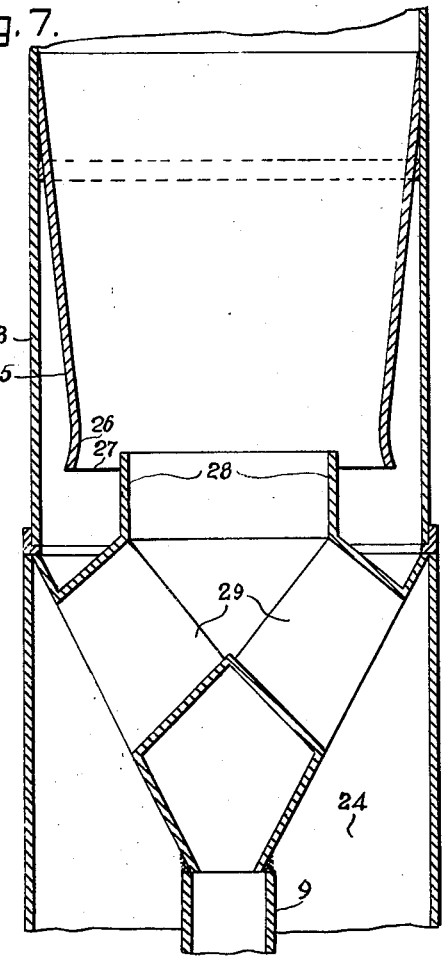
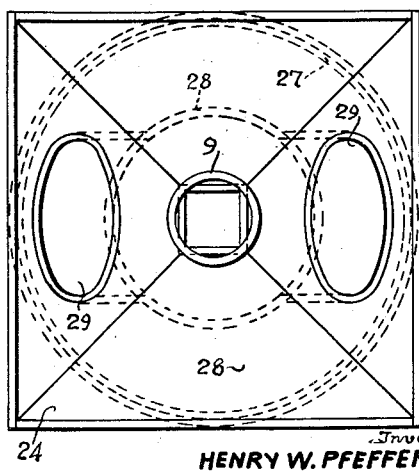
INVENTORS
HENRY W. PFEFFER,
HARRY O. DANZ, Patented Dec. 12, 1939

2,182,854

UNITED STATES PATENT OFFICE 2,182,854

DUST COLLECTION APPARATUS

Henry W. Pfeffer, Philadelphia, Pa., and Harry O. Danz, Detroit, Mich., assignors to American Blower Corporation, Detroit, Mich., a corporation of Delaware Application July 24, 1937, Serial No. 155,468

9 Claims. (Cl. 183—107)

Our invention relates to dust collectors and in particular to a gravity dust collector in combination with a secondary collector.

It is the object of our invention to provide means for dividing a main air stream that is dust laden into a plurality of independent streams and thereafter the independent streams of air so divided are subjected to helical motions to throw the dust out centrifugally. The dust descends by gravity and is separated from the dust-free air, which is conveyed away while the dust with any entrained air proceeds by gravity and then under the influence of a fan to move through a secondary collector where the remaining air is extracted from the dust, the dust is collected, and the dust-free air is returned to the main air stream.

It is a further object to provide novel means of separating the dust-free air centrally of the stream and of then returning the dust and entrained air that are thrown out centrifugally back to the center of the stream for dust deposit.

Referring to the drawings:

Figure 2 is a detailed view in section of the dust collecting apparatus in the primary dust collector.

Figure 3 is a detailed view of one form of the dust collecting separator of the primary collector.

Figure 4 is a section on the line 4—4 of Figure 3 at right angles to the section of Figure 3.

Figure 5 is a bottom plan view of Figure 4.

Figure 6 is a central vertical section of a modified form of Figure 3.

Figure 7 is a central vertical section of a modified form of Figure 4.

Figure 8 is a bottom plan view of Figure 7.

Figure 1:
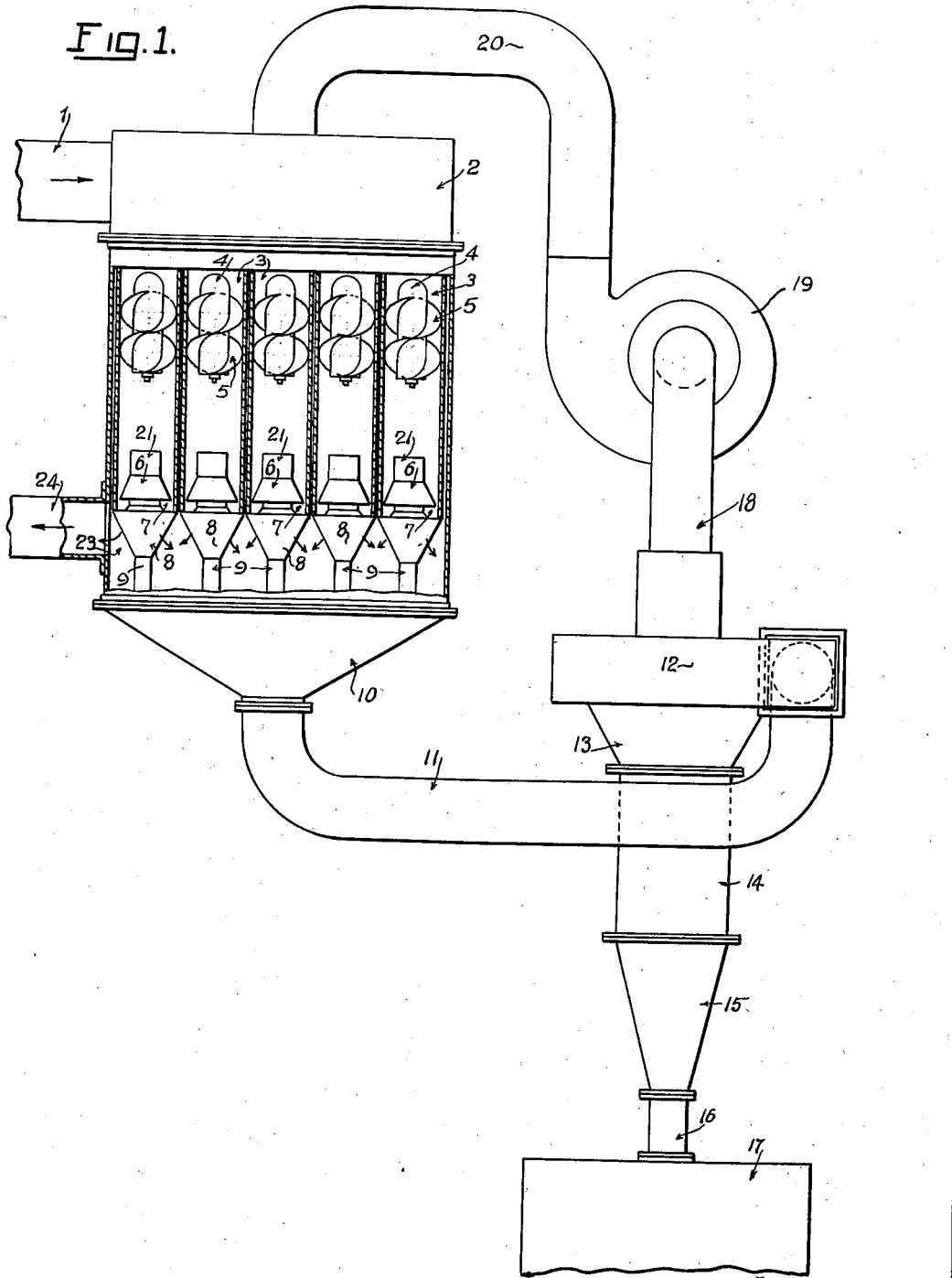
Figure 1 is an elevation of our dust collection system with a primary dust collector partially in section.

Referring to the drawings in detail, 1 is an inlet passageway for dust-laden air which enters the header 2. The dust then proceeds downwardly through a plurality of separator tubes 3 in which there is a conical splitting or guiding member 4 for forming the dust-laden air into a cylindrical stream which engages with the helix 5 that imparts a whirl to it so that dust is thrown out centrifugally onto the inside of the tube 3. This dust descends on the inside of the tube 3 so that the dust passes between the conical skirt 6 and the inside of the tube 3 as at 7, whence it passes into the conical hopper 8 and thence through the tube 9 into the common main hopper 10, whence the dust with any entrained air passes through the pipe 11 into the volute 12 of a secondary collector. The fact that the skirt 6 extends downwardly and outwardly causes further separation of the dust and air by imparting to the dust-laden air a simultaneously outward and downward movement. It is apparent that the tube 21 and the skirt portion 6 cooperate to form an annular opening with respect to the tube 3, the size of the opening steadily decreasing with the result that the dust content of the outermost layer of the dust-laden air is skimmed off and the dust is permitted to pass through the small opening into the hopper 8. The amount of air which passes out with the dust is extremely small on account of the restriction of the opening. After passing through the hopper 10, the dust then proceeds downwardly in a spiral of decreasing diameter through the successive stages of the secondary dust collector formed by the conical member 13, the tubular member 14, the conical member 15, tubular member 16, and thence into the dust hopper 17. The dust-free air leaves through the pipe 18 under the influence of the fan 19 and is discharged through the pipe 20 into the header tube.

Returning to the primary collector, the central portion of the body of air passing through the tube 3 is dust-free. It therefore passes through the central tube 21 and then is divided into one or more diagonal streams by passing through the diagonal passageways 22, whence it passes as dust-free air into the chamber 23 and thence into the exit pipe 24. A partition is provided just below the openings of the passageways 22 to separate the compartment 23 from the hopper 10 and pipes 9 which are conveying away the dust.

In the alternative forms shown in Figures 3 to 8, the following is the arrangement and method of operation. In Figures 3, 4 and 5, the dust-laden air is thrown out centrifugally on the inside of the tube 3 so that it passes as described over the skirt 6 through the passageway 7 into the hopper 8 and out through the pipe 9 while the diagonal passageways 22 from the pipe 21 convey the dust-free air into the interior of the pipe 24, which in this case proceeds parallel to the pipe 9 and at right angles to it.

In Figures 5, 6 and 7, the dust-laden air emerging from the spiral helix 5 passing over the conical tubular member 4 inside of the tube 3 thence passes into a Venturi-shaped throat member 25 which flares outwardly at its lower end at 26 to permit the dust that is thrown out centrifugally on the inside of 25 to pass out through the passageway 27 between the inside of 26 and the outside of the dust-free air tube 28, which has diagonal passageways 29 which extend outwardly through the dust-collecting hopper 30 into the passageway 24.

The dust collecting hopper 30 is provided with a pipe 9 for conveying away the dust as heretofore described.

It will be understood that we desire to comprehend within our invention such modifications as may be clearly embraced within the claims and scope of our invention.

Having thus fully described our invention, what we claim as new and desire to secure by Letters Patent, is:

1. In a dust collector, a passageway for dust-laden air, a collector therein comprising a plurality of parallel vertically disposed tubes, a spherical-faced cylindrical member with a spiral helix on the exterior thereof located in each tube at the entrance thereto, a skirted tubular member at the bottom of each tube comprising means for extracting the dust-free air at the center of the tube and conveying it away laterally of the tube, means for conveying the dust on the inside of the tube adjacent its inner wall to a point centrally of the tube, means connected to the dust collection means for conveying said dust and its entrained air to a secondary collector, means for extracting said entrained air from said secondary collector, and means of conveying dust-free air from the secondary collector into the entrance of the first mentioned collector.

2. In a dust collector, a vertically disposed tube, an interiorly spaced air tube having diverging angularly disposed air exit tubes which communicate with a main outlet, a dust diverting skirt mounted on said interiorly-spaced air tube with its lower margin spaced from the first mentioned tube, and a converging hopper therebeneath mounted in the first-mentioned tube and connected to a dust conveying pipe, said diverging air tubes arranged to pass through the walls of said hopper so that the air in the air tube can make its exit therethrough into the main air outlet beyond the hopper.

3. In a dust collector, the combination of a vertically disposed tube, a conical hopper having an open bottom mounted therein, an air tube mounted in said open bottom in spaced relationship thereto and having diverging bottom tubes, a second hopper through the walls of which said diverging air tubes project, and a dust pipe connected to the bottom of said second hopper for conveying dust away from the first-mentioned tube while the first-mentioned tube conveys away dust-free air.

4. In a dust collector, a plurality of tubular members, means therein for imparting a centrifugal movement to dust-laden air, causing a partial separation of the dust from the air and forcing the dust against the interior surface of said tubular members, means for skimming off the outermost portion of the moving air stream to remove the dust particles with the minimum amount of entrained air, said last-mentioned means comprising members having skirt portions which extend toward the interior of said tubular members, leaving small openings which pass all of the dust concentrated at the walls of the tubular members, but restrict the amount of air which passes out with the dust, and means for conveying dust with any entrained air away therefrom.

5. In a dust collector, a plurality of vertically disposed tubular members, means therein for imparting a downward spiral and centrifugal movement to dust-laden air, causing a partial separation of the dust from the air and forcing the dust against the interior surface of said tubular members, means for skimming off the outermost portion of the moving stream to remove the dust with the minimum amount of entrained air, said last-mentioned means comprising hollow cylindrical members having skirt portions which extend downwardly toward the interior of said tubular members, leaving small annular openings which pass all of the dust concentrated at the walls of the tubular members but restrict the amount of air which passes out with the dust, and means for conveying dust with any entrained air away therefrom, the interior of said hollow cylindrical members permitting the passage of air which has been separated from the dust by the means which imparts a spiral and centrifugal movement to the dust-laden air.

6. In a dust collector, a passageway for dust-laden air, a collector therein comprising a plurality of parallel vertically disposed tubes, a cylindrical member provided with a spiral helix on the exterior thereof located in each tube at the entrance thereto, a skirted tubular means at the bottom of each tube for separating the dust from the air and for conveying the air toward the center of each of said tubes, means for collecting the air and expelling the collected air laterally of the collecting means, said skirted tubular means also skimming off the dust on the interior wall of said tubes and conveying the dust to a point centrally of said tubes.

7. In a dust collector, the combination of vertically disposed parallel tubes connected to an inlet for dust-laden air and to outlets for dust-free air and for dust, means in each of said tubes for imparting a helical whirl to the air to throw out dust centrifugally, means at the bottom of each tube for collecting the dust from the inside of the wall of the tube and delivering it centrally of the tube into a common hopper disposed therebetween, said means comprising hollow cylindrical means provided with skirt portions which extend downwardly and outwardly toward the interior surfaces of said parallel tubes, leaving small annular openings which pass all of the dust concentrated at the walls of said parallel walls but restrict the amount of air which passes out with the dust, said dust being collected and delivered centrally of said parallel tubes into said common hopper.

8. In a dust collector, means for conveying dust-laden gases, a plurality of primary centrifugal and gravity-acting dust collectors vertically disposed therein, means for conveying away dust-free air, skirted tubular means for skimming off the outermost portion of the centrifugally moving air stream and conveying away dust from the primary collector with a minimum amount of entrained air.

9. In a dust collecting apparatus, a horizontally disposed main air passageway for conveying dust-laden gases and dust-free gases, a primary dust collector arranged transversely thereof comprising a plurality of compartments open at both ends, means in each compartment for imparting a whirl to individual bodies of said dust-laden air and of concentrating dust while the dust-free air passes on to the main passageway, skirted tubular skimmer means disposed in each compartment for removing the dust particles with a minimum amount of air, a common collecting means for collecting the dust and any entrained air from said compartments of the primary dust collector, and means for limiting the proportionate amount of dust and entrained air released by the respective compartments.

HENRY W. PFEFFER.
HARRY O. DANZ.